United States Patent Office 3,053,729
Patented Sept. 11, 1962

3,053,729
INSECTICIDAL COMPOSITIONS
Yun-Pei Sun, Modesto, Calif., assignor to Shell Oil Company, a corporation of Delaware
No Drawing. Filed Oct. 26, 1959, Ser. No. 848,499
5 Claims. (Cl. 167—22)

The present invention relates to novel insecticidal compositions containing as the active insecticidal component vinyl esters of pentavalent phosphorus acids. More specifically, the present invention relates to novel and unexpectedly superior insecticidal compositions containing vinyl esters of pentavalent phosphoric acid, and a pyrethrum synergist such as the 2-(2-ethoxyethoxy)ethyl 3,4-methylenedioxyphenyl acetal of acetaldehyde.

The vinyl insecticides particularly contemplated by the present invention may be defined by reference to the following formula:

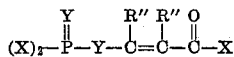

wherein each X independently represents R, RO—, RHN—, R₂N—, RORO—, and

R is an alkyl group preferably up to six carbon atoms, an aryl group such as phenyl, tolyl, naphthalenyl, anthracenyl or benzyl (preferred), an aralkyl group, the alkyl portion of which contains up to six carbon atoms and the aryl portion of which is phenyl, tolyl, naphthalenyl, anthracenyl or benzyl (preferred). R may be unsubstituted or substituted with groups such as amino, nitro and halogen. Each R″ independently represents hydrogen, halogen (preferably chlorine) or an alkyl group of up to six carbon atoms (preferably methyl). Y is a sulfur atom or an oxygen atom (preferably oxygen).

Of the compounds encompassed by this formula, those falling within the following more specific formulae are preferred:

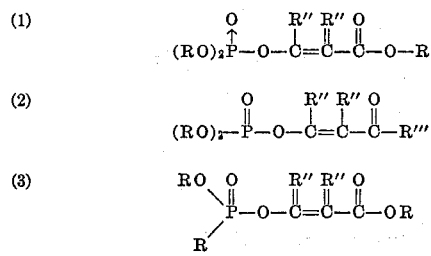

In these formulae, R is an alkyl group preferably up to six carbon atoms; an aryl group such as phenyl, tolyl, naphthalenyl, anthracenyl or benzyl (preferred), or an aralkyl group, the alkyl portion of which contains up to six carbon atoms and the aryl portion of which is phenyl, tolyl, naphthalenyl, anthracenyl or benzyl (preferred). R may be unsubstituted or substituted with groups such as amino, nitro and halogen. Each R″ independently represents hydrogen, halogen (preferably chlorine) or an alkyl group up to six carbon atoms. R‴ is an amino group or a substituted amino group.

The novel compounds of the present invention may be prepared if desired by reacting the appropriate phosphite or phosphonite such as a dialkyl arylphosphonite or a trialkyl phosphite with the appropriate halo-acid ester or amide such as an alpha-chloro-beta-oxo fatty acid ester or amide as shown in the following formula:

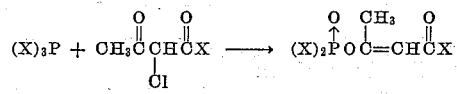

In this equation X represents the groups defined in the generic formula. Specific examples of preparations of compounds contemplated for the novel insecticidal compositions of the present invention are to be found in U.S. application Serial No. 704,342, filed December 23, 1957; Serial No. 704,341, filed December 23, 1957; Serial No. 555,753, filed December 28, 1955; Serial No. 576,786, filed April 9, 1956; and U.S. 2,802,855, issued August 13, 1957. Specific examples of vinyl esters of pentavalent phosphorus acids encompassed by Formula 1 are: 2-(methoxycarbonyl)-1-methylvinyl dimethyl phosphate; dimethyl 1 - methyl - 2 - (5 - phenylpentyloxycarbonyl) - vinyl phosphate; dimethyl 1-methyl-2-(2-benzyloxyethoxycarbonyl)vinyl phosphate; dimethyl 1-methyl-2-(tolyloxycarbonyl)vinyl phosphate; dimethyl 1-methyl-2-(phenoxycarbonyl)vinyl phosphate; 2 - (benzyloxycarbonyl) - 1 - methylvinyl dimethyl phosphate; 2-(p-methoxyphenoxycarbonyl)-1-methylvinyl dimethyl phosphate; diethyl 1-methyl-2-(p-tolyloxycarbonyl)vinyl phosphate; 1-methyl-2-(phenethoxycarbonyl)vinyl dipropyl phosphate; 2-(p-methoxybenzyloxycarbonyl) - 1 - methylvinyl dimethyl phosphate, dimethyl 2-(alpha-methylbenzyloxycarbonyl)-1-methylvinyl phosphate; dimethyl 1-methyl-2-(2-phenoxyethoxycarbonyl)vinyl phosphate; 1 - methyl - 2 - (5 - phenylpentyloxycarbonyl)vinyldipentyl phosphate; 2-methoxycarbonyl-1-methylvinyl methyl p-nitrophenyl phosphate; 2-ethoxycarbonyl-1-methylvinyl ethyl p-nitrophenyl phosphate; 2 - (p - chlorophenoxycarbonyl) - 1 - methyl - vinyl dimethyl phosphate; 2 - (p - chlorobenzyloxycarbonyl)-1-methylvinyl dimethyl phosphate; 2-(o-chlorobenzyloxycarbonyl)-1-methylvinyl dimethyl phosphate; 2-(2,3-dichlorobenzyloxycarbonyl)-1-methylvinyl dimethyl phosphate; o-(3,4-dichlorobenzyloxycarbonyl)-1-methylvinyl dimethyl phosphate; 2-(p-chloro-alpha-methylbenzyloxycarbonyl)-1-methylvinyl dimethyl phosphate; 2-(5-(p - fluorophenyl)pentyloxycarbonyl) - 1 - methylvinyl dimethyl phosphate; 2-(p-iodobenzyloxycarbonyl)-1-methylvinyl dimethyl phosphate; 2-(o-bromobenzyloxycarbonyl)-1-methylvinyl dimethyl phosphate; dimethyl 1-methyl - 2 - (2,3,4,5,6 - pentachlorobenzyloxycarbonyl) - vinyl phosphate; 2-(p-chlorotolyloxycarbonyl)-1-methylvinyl dimethyl phosphate; 2-(-p-chlorophenoxycarbonyl)-1-methylvinyl dipentyl phosphate; 2-(p-chlorobenzyloxycarbonyl)-1-methylvinyl diethyl phosphate.

Among the compounds encompassed by Formula 2 are: diethyl 1-phenylcarbamoyl-1-propen-2-yl phosphate; diethyl 1 - (p - nitrophenylcarbamoyl) - 1 - propen - 2 - yl phosphate; diethyl 1-(methylphenylcarbamoyl)-1-propen-2-yl phosphate.

Among the compounds encompassed by Formula 3 are: methyl 1-ethoxycarbonyl-1-propen-2-yl phenylphosphonate; methyl 1-methoxycarbonyl-1-propen-2-yl phenylphosphonate; ethyl 1-ethoxycarbonyl-1-propen-2-yl phenylphosphonate; ethyl 2-methoxycarbonyl-1-methylvinyl (p-dimethylaminophenyl)phosphonate.

Other compounds encompassed by the present invention are:

2-(2-acetoxyethoxycarbonyl) - 1 - methylvinyl dimethyl phosphate;
2-(2-acetoxyethoxycarbonyl)-1-methylvinyl diethyl phosphate;
2-(2-methoxypropoxycarbonyl)-1 - methylvinyl dimethyl phosphate;
2-(2 - ethoxycarbonylethoxycarbonyl) - 1 - methylvinyl dimethyl phosphate;
2-(2-benzoyloxyethoxycarbonyl) - 1 - methylvinyl dimethyl phosphate;
bis(2-methoxyethyl) 2-(2-methoxyethoxycarbonyl) - 1-methylvinyl phosphate;
2-ethoxycarbonyl-1-methylvinyl ethyl 2 - methoxyethyl phosphate;
2 - (3 - ethoxycarbonylpropoxycarbonyl) - 1,2 - dimethylvinyl dibutyl phosphate;
2-(2 - butoxycarbonylbutoxycarbonyl) - 1 - ethylvinyl dipentyl phosphate;
2-(2-butoxybutoxycarbonyl)-1 - phenylvinyl diisopropyl phosphate;
bis(2-methoxyethyl) 2-ethoxycarbonyl - 1 - methylvinyl phosphate;
2-methoxyethyl 2-methoxycarbonyl-1-methylvinyl methyl phosphate;
bis(2-acetoxyethyl) 2-ethoxycarbonyl-1-methylvinyl phosphate;
2-acetoxyethyl 2-ethoxycarbonyl-1-methylvinyl methyl phosphate;
2-(2-acetoxyethoxycarbonyl)ethenyl dimethyl phosphate;
2-(methoxycarbonyl)-1-methylvinyl dimethyl thiophosphate;
2-(3 - ethoxycarbonyl-propoxycarbonyl) - 1,2 - dimethylvinyl dibutyl dithiophosphate.

It is to be understood, however, that the present invention is not restricted to the enumerated examples nor to the generic formulae but encompasses all insecticidal vinyl esters of pentavalent phosphorus acids.

Pyrethrum synergists are broadly encompassed by the present invention. Particularly contemplated are those pyrethrum synergists containing a

group. Of these, it has been found that compounds having the following structural formula are most effective:

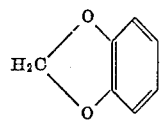

In this formula, R may represent a straight chain, branched chain or cyclic alkyl group preferably of 1 to 20 carbon atoms, either saturated or unsaturated. R may also represent a carboalkyl group that is a group containing one or more

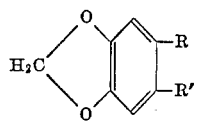

alkyl groups. R may also represent a carboalkoxy group, i.e., a group containing one or more

alkyl groups. R also encompasses alkyl sulfoxy groups, i.e., groups containing one or more

alkyl groups. When R is carboalkyl, carboalkoxy or alkyl sulfonyl, the alkyl portion is straight chain, branched chain or cyclic alkyl preferably of 1 to 20 carbon atoms, either saturated or unsaturated.

R' is a hydrogen atom or a group of the type defined for R. R and R' taken together can represent a divalent radical, which together with the indicated carbon atoms forms a cyclic alkyl, carboalkyl, carboalkoxy, or alkyl sulfoxy group preferably of 1 to 20 carbon atoms, either saturated or unsaturated. The structures of specific synergists encompassed by the present invention follow:

n-Propyl isome:

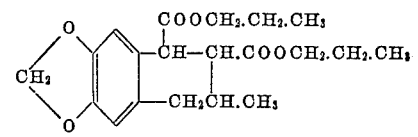

Piperonyl cyclonene:

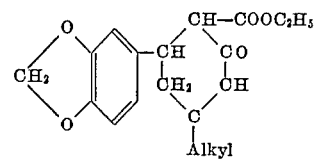

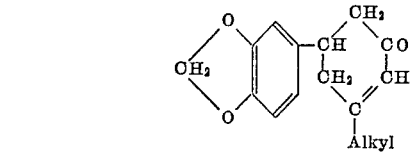

Piperonyl butoxide:

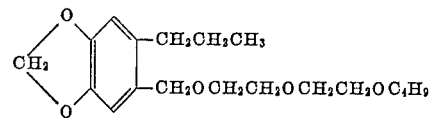

Sulfoxide:

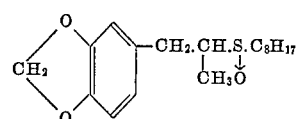

Sesoxane:

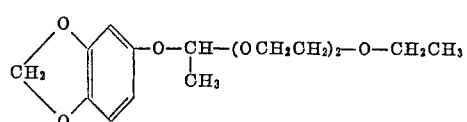

The last of the structures shown is the preferred synergist of the present invention, namely, 2-(2-ethoxyethoxy)-ethyl 3,4-methylenedioxyphenyl acetal of acetaldehyde.

The synergistic activity of 2-(2-ethoxyethoxy)ethyl 3,4-methylenedioxyphenyl acetal of acetaldehyde is illustrated by the following table giving the results of tests against the housefly, Musca domestica. The first column of figures shows the number of times the insecticidal activity of each enumerated compound is increased by the addition of 2-(2-ethoxyethoxy)ethyl 3,4-methylenedioxyphenyl acetal of acetaldehyde. The second column of figures shows the toxicity index of each of the compounds tested without synergist, and the figures in column three show the toxicity index with the presence of synergist. The extraordinary synergistic properties of the preferred insecticidal compositions of the present invention are immediately apparent from the figures in column one. Toxicity of insecticidally active vinyl esters of pentavalent phosphorus acids has been increased as much as thirty-four times by the addition of 2-(2-ethoxyethoxy)ethyl 3,4-methylenedioxyphenyl acetal of acetaldehyde.

The synergized increase in insecticidal activity effected by the addition of 2-(2-ethoxyethoxy)ethyl 3,4-methylene-

| Compound | LD-50 | Toxicity index |
|---|---|---|
| 2 - methoxycarbonyl - 1 - methylvinyl methyl p-nitrophenyl phosphate | 0.0098 | 100 |
| 2 - methoxycarbonyl - 1 - methylvinyl methyl p-nitrophenyl phosphate + 1% 2-(2-ethoxyethoxy) ethyl 3,4-methylene-dioxyphenyl acetal of acetaldehyde | 0.0061 | 161 |
| 2 - ethoxycarbonyl - 1 - methylvinyl ethyl p - nitrophenyl phosphate | 0.0077 | 100 |
| 2 - ethoxycarbonyl - 1 - methylvinyl ethyl p - nitrophenyl phosphate + 1% 2-(2-ethoxyethoxy) ethyl 3,4-methylenedioxyphenyl acetal of acetaldehyde | 0.0055 | 140 |
| 2 - methoxycarbonyl - 1 - methylvinyl ethyl (p-dimethylaminophenyl) phosphonate | 0.068 | 100 |
| 2 - methoxycarbonyl - 1 - methylvinyl ethyl (p-dimethylaminophenyl) phosphonate + 1% 2-(2 - ethoxyethoxy) ethyl 3, 4 - methylenedioxyphenyl acetal of acetaldehyde | 0.002 | 3400 |

| Compound | Increase in toxicity with 1% 2-(2-ethoxyethoxy)ethyl 3,4-methylenedioxyphenyl acetal of acetaldehyde (number of times) | Toxicity index (Dieldrin as Standard=100) | |
|---|---|---|---|
| | | Without 2-(2-ethoxyethoxy)ethyl 3,4-methylenedioxyphenyl acetal of acetaldehyde | With 1% 2-(2-ethoxyethoxy)ethyl 3,4-methylenedioxy-phenyl acetal of acetaldehyde |
| Dimethyl 1-methoxycarbonyl-1-propen-2-yl phosphate | 2.45 | 120 | 295 |
| Diethyl 2-(dimethylcarbamoyl)-methylvinyl phosphate | 25.2 | 12 | 302 |
| Dimethyl 2-(dimethylcarbamoyl)-1-methylvinyl phosphate | 19.7 | 12 | 236 |
| N,N-diallyl-3-(dimethoxyphosphinyloxy)crotonamide | 30.4 | 11.8 | 360 |
| N,N-diallyl-2-chloro-3-(dimethoxy-phosphinyloxy)crotonamide | 17.9 | 8.3 | 149 |
| 2-methoxycarbonyl-1-methylvinyl ethyl p-dimethylaminophenyl phosphonate | 34.0 | 4.2 | 143 |
| 4'-chloro-3-(dimethoxyphosphinyloxy)crotonanilide | 7.7 | 16 | 123 |
| Dimethyl 1-methyl-2-(phenoxy-carbonyl)vinyl phosphate | 2.0 | 13.4 | 26.8 |
| 2-(benzyloxycarbonyl)-1-methylvinyl dimethyl phosphate | 3.84 | 18.6 | 71.5 |
| 2-(p-chlorobenzyloxycarbonyl)-1-methylvinyl dimethyl phosphate | 2.53 | 22 | 55.8 |
| 2-ethoxycarbonyl-1-methylvinyl ethyl p-nitrophenyl phosphate | 1.4 | 42 | 59 |
| 2-methoxycarbonyl-1-methylvinyl methyl p-nitrophenyl phosphate | 1.61 | 37 | 59.5 |
| 2,4-dichlorophenyl ethyl 2-methoxy-carbonyl-1-methylvinyl phosphate | 6.13 | 2 | 12.3 | dioxyphenyl acetal of acetaldehyde may also be expressed in terms of the LD–50 of a broad spectrum of vinyl esters of pentavalent phosphorous acids as indicated in the following table:

*Toxicity of Phosphorus Insecticides With and Without 2 - (2 - Ethoxyethoxy)Ethyl 3,4 - Methylenedioxyphenyl Acetal of Acetaldehyde on Houseflies*

| Compound | LD-50 | Toxicity index |
|---|---|---|
| Dimethyl - 1 - methoxycarbonyl - 1 - propen - 2 - yl-phosphate | 0.0054 | 100 |
| Dimethyl - 1 - methoxycarbonyl - 1 - propen- 2 - yl-phosphate + 1% 2-(2-ethoxyethoxy) ethyl 3, 4-methylenedioxyphenyl acetal of acetaldehyde | 0.0022 | 245 |
| Dimethyl 1 - methyl - 2 - (phenoxycarbonyl) vinyl phosphate | 0.033 | 100 |
| Dimethyl 1 - methyl - 2 - (phenoxycarbonyl) vinyl phosphate + 1% 2-(2-ethoxyethoxy) ethyl 3, 4-methylenedioxyphenyl acetal of acetaldehyde | 0.0165 | 200 |
| 2-(benzyloxycarbonyl)-1-methylvinyl dimethyl phosphate | 0.0223 | 100 |
| 2 - (benzyloxycarbonyl) - 1 - methylvinyl dimethyl phosphate + 1% 2-(2-ethoxyethoxy) ethyl 3, 4-methylenedioxyphenyl acetal of acetaldehyde | 0.0058 | 384 |
| 2 - (p - chlorobenzyloxycarbonyl) - 1 - methylvinyl dimethyl phosphate | 0.023 | 100 |
| 2 - (p - chlorobenzyloxycarbonyl) - 1 - methylvinyl dimethyl phosphate + 1% 2-(2-ethoxyethoxy) ethyl 3, 4-methylenedioxyphenyl acetal of acetaldehyde | 0.0091 | 253 |
| 2 - (2 - acetoxyethoxycarbonyl) - 1 - methylvinyl dimethyl phosphate | 0.055 | 100 |
| 2 - (2 - acetoxyethoxycarbonyl) - 1 - methylvinyl dimethyl phosphate + 1% 2-(2-ethoxyethoxy) ethyl 3, 4-methylenedioxyphenyl acetal of acetaldehyde | 0.0063 | 873 |
| Dimethyl 2-(dimethylcarbamoyl)-1-methylvinyl phosphate | 0.059 | 100 |
| Dimethyl 2-(dimethylcarbamoyl)-1-methylvinyl phosphate + 1% 2-(2-ethoxyethoxy) ethyl 3, 4-methylenedioxyphenyl acetal of acetaldehyde | 0.003 | 1267 |
| Diethyl 2-(dimethylcarbamoyl)-1-methylvinyl phosphate | 0.063 | 100 |
| Diethyl 2-(dimethylcarbamoyl)-1-methylvinyl phosphate + 1% 2-(2-ethoxyethoxy) ethyl 3, 4-methylenedioxyphenyl acetal of acetaldehyde | 0.0025 | 2520 |
| 4' - chloro - 3 - (dimethoxyphosphinyloxy) - crotonanilide | 0.034 | 100 |
| 4' - chloro - 3 - (dimethoxyphosphinyloxy)-croton - anilide + 1% 2- (2-ethoxyethoxy) ethyl 3, 4-methylenedioxyphenyl acetal of acetaldehyde | 0.0044 | 773 |

The relative toxicity, i.e., toxicity index, given in this table for each compound represents the ratio of the concentration in weight/volume percent of the standard at which, under standard test conditions, a 50% mortality of the insects in each test was observed, to the concentration in weight/volume percent of the toxic agent in the solvent at which, under standard test conditions, a 50% mortality of the insects in each was observed.

Relative toxicity (toxicity index)

$$= \frac{\text{LD-50 of the standard}}{\text{LD-50 of a test sample}} \times 100$$

The quantity of standard employed to give 50% mortality of the insects in each test was arbitrarily given a numerical value of 100. The toxicity of a representative product of the invention against houseflies (*Musca domestica*) was determined generally following the method described by Y. P. Sun (Journal of Economic Entomology, vol. 43, page 45 (1950)). Solutions of representative compounds were made up by employing a neutral petroleum distillate lying within the kerosene range as a solvent.

The concentration in weight per volume percent required to give under standard test conditions a 50% mortality to houseflies when employing an insecticidal composition comprising five different synergists all containing a group combined with three vinyl phosphate insecticides was also ascertained as shown in the following table.

| Synergist | Increase in toxicity with 1% synergist (expressed in number of times increased over toxicant without synergist) | | |
| --- | --- | --- | --- |
| | 2-Carbomethoxy-1-methyl-vinyl ethyl p-dimethyl-aminophenyl phosphonate | Dimethyl 2-(dimethyl-carbamoyl) - 1 - methyl vinyl phosphate | N,N diallyl-3-(dimethoxy-phosphinyloxy) crotonamide |
| 3,4-methylenedioxyphenyl —O—CH(CH₃)—(OCH₂CH₂)₂—O—CH₂CH₃ | 34.0 | 19.7 | 30.4 |
| 3,4-methylenedioxyphenyl with —CH₂CH₂CH₃ and —CH₂OCH₂CH₂OCH₂CH₂OC₄H₉ | 9.0 | 4.1 | 4.0 |
| 3,4-methylenedioxyphenyl —CH₂·CH(CH₃O→)·S·C₈H₁₇ | 5.0 | 1.7 | 7.7 |
| 3,4-methylenedioxyphenyl succinate-type (H—COOC₂H₅, alkyl) | 4.5 | ---- | ---- |
| 3,4-methylenedioxyphenyl succinate-type (CH₃, alkyl) | | | |
| 3,4-methylenedioxyphenyl —CH(—CH₂CH(CH₃)₂)—CH(COOCH₂·CH₂·CH₃)—COOCH₂·CH₂·CH₃ | 3.8 | 1.6 | 2.5 |

This table shows the extraordinary ability of the defined synergists to increase the toxicity of vinyl phosphate insecticides.

The defined compounds of the present invention, such as 2-(2-ethoxyethoxy)ethyl 3,4-methylenedioxyphenyl acetal of acetaldehyde, have in the past been employed as synergists for pyrethrum. However, these materials have never been found effective as synergists for vinyl esters of pentavalent phosphorus acid insecticides. It is clear that the effect of these synergists on the pyrethrums differs radically in mechanism from their synergistic effect on the vinyl phosphorus acids of the present compositions because of the radical difference in the nature of the insecticides. Pyrethrums are mixed esters of pyrethrolone and cinerolone ketoalcohols with 2-chrysanthemum carboxylic acids. This material is obtained by extraction of ground dried chrysanthemum cinerafolium flowers. The vinyl phosphorus insecticides of the present compositions, on the other hand, are synthetically manufactured and differ radically in their structure and mode of activity. Though the exact mechanism of the present synergists on vinyl phosphorus acid esters is not clearly understood, it is clear that these synergists are quite specific in their function. For example, 2-(2-ethoxyethoxy)ethyl 3,4-methylenedioxyphenyl acetal of acetaldehyde does not synergize all phosphorus-containing insecticides as indicated by the following table:

| Compound | Toxicity with 1% 2-(2-ethoxyethoxy)ethyl 3,4-methylenedioxyphenyl acetal of acetaldehyde compared to compound alone |
| --- | --- |
| 0,0 - dimethyl - S - (1,2 - bis(ethoxycarbonyl)ethyl dithiophosphate (Malathion) | 1.14 |
| 0,0-diethyl 0-p-nitrophenyl thiophosphate (Parathion) | 0.63 |
| 0-ethyl 0-p-nitrophenyl phenylphosphorothioate (EPN) | 0.70 |

It is immediately apparent from this table that 2-(2-ethoxyethoxy)ethyl 3,4-methylenedioxyphenyl acetal of acetaldehyde does not significantly affect the insect toxicity of non-vinyl type phosphorus-containing insecticides. In the case of vinyl esters of pentavalent phosphorus acid insecticides, on the other hand, the addition of this synergist significantly increases the insecticidal activity of the phosphorus compound far beyond what might be expected from the additive effectiveness of the components in the insecticidal composition.

The synergists employed in the present invention may vary considerably in the concentration employed in the insecticidal mixture. Thus, the synergists of the present invention may be present in less than 1% and may, if desired, be employed in concentrations in excess of 10% by weight of the insecticidal composition. Approximately 1% by weight of the synergist in the insecticidal composition is preferred.

The compositions of this invention can be employed for insecticidal purposes by the use of any of the methods which are conventionally employed in the art. For example, the compounds can either by sprayed or otherwise applied in the form of a solution or dispersion or they can be absorbed on an inert, finely divided solid and applied as a dust. Useful solutions for applications by spraying, brushing, dipping and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long chain fatty alcohols, alkyl aryl sulfonates, long chain alkyl sulfonates, phenol-ethylene oxide condensates, $C_{12}$ to $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include: talc, bentonite, lime, gypsum, pyrophyllite and similar inert solid diluents. If desired, the compounds of the present invention can be employed as aerosols, as by dispersing the same into the atmosphere by means of a compressed gas.

The concentration of the phosphorus compounds to be used in the compositions of the present invention is dependent upon many factors, including the particular compounds utilized, the carrier employed, the method and conditions of application, and the insect species to be controlled, a proper consideration and resolution of these factors being within the skill of those well versed in the insecticide art. In general, however, the compounds of the present synergized compositions are effective in concentrations of from about 0.01% to 0.5%, based upon the total weight of the composition, though under the same circumstances as little as about 0.00001% or as much as 2% or even more of the compound can be employed with good results from an insecticidal standpoint.

The novel compositions of the present invention may be employed alone or in conjunction with other insecticidally active materials. Representative insecticides which may be added to the present compositions include the naturally occurring insecticides such as pyrethrum, rotenone, sabadilla, and the like, as well as the various synthetic insecticides including DDT, benzene hexachloride, cyanides, tetraethyl pyrophosphate, diethyl p-nitrophenyl thiophosphate, and the various compounds of arsenic, lead and/or fluorine.

This application is a continuation-in-part of application Serial No. 777,200, filed December 1, 1958, now abandoned.

I claim as my invention:

1. An insecticidal composition comprising a phosphorus-containing insecticide and a methylenedioxyphenyl compound, in proportions corresponding to from about 0.0001 part to about 2 parts by weight of said insecticide to from about 1 part to about 10 parts by weight of said methylenedioxyphenyl compound, said insecticide having the formula:

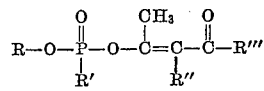

wherein R is alkyl of from 1 to 2 carbon atoms, R' is a member of the group consisting of alkyloxy of from 1 to 2 carbon atoms, dimethylaminophenyl, nitrophenyloxy, dichlorophenyloxy and dimethylamino, R" is a member of the group consisting of hydrogen and chlorine, and R''' is a member of the group consisting of methoxy, phenoxy, benzyloxy, chlorobenzyloxy, 2-acetoxyethyl, dimethylamino, diallylamino chlorophenylamino, and tertiary-butylamino, and said methylenedioxyphenyl compound is a member of the group consisting of sesoxane, n-propyl isome, piperonyl butoxide, piperonyl cyclonene and sulfoxide.

2. An insecticidal composition according to claim 1 wherein the methylenedioxyphenyl compound is sesoxane.

3. An insecticidal composition according to claim 2 wherein the insecticide is dimethyl 1-methoxycarbonyl-1-propen-2-yl phosphate.

4. An insecticidal composition according to claim 2 wherein the insecticide is diethyl 2-(dimethylcarbamoyl)-1-methylvinyl phosphate.

5. An insecticidal composition according to claim 2 wherein the insecticide is dimethyl 2-(dimethylcarbamoyl)-1-methylvinyl phosphate.

References Cited in the file of this patent

UNITED STATES PATENTS

| | | |
|---|---|---|
| 2,685,552 | Stiles | Aug. 3, 1954 |
| 2,765,331 | Whetstone | Oct. 2, 1956 |
| 2,802,855 | Whetstone | Aug. 13, 1957 |
| 2,864,740 | Dweley | Dec. 16, 1958 |
| 2,864,849 | Schrader | Dec. 16, 1958 |
| 2,865,944 | Stiles | Dec. 23, 1958 |
| 2,891,887 | Gilbert | June 23, 1959 |
| 2,894,014 | Stiles | July 7, 1959 |
| 2,913,367 | Dawson | Nov. 17, 1959 |